US012608383B2

(12) United States Patent
Seth et al.

(10) Patent No.: US 12,608,383 B2
(45) Date of Patent: Apr. 21, 2026

(54) BULK MATCHING DATA RECORD ENTITIES

(71) Applicant: International Business Machines Corporation, Armonk, NY (US)

(72) Inventors: Abhishek Seth, Deoband (IN); Soma Shekar Naganna, Bangalore (IN); Neeraj Ramkrishna Singh, Bangalore (IN); Trent A. Gray-Donald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/489,346

(22) Filed: Oct. 18, 2023

(65) Prior Publication Data

US 2025/0131000 A1 Apr. 24, 2025

(51) Int. Cl.
*G06F 16/2457* (2019.01)
*G06F 16/22* (2019.01)

(52) U.S. Cl.
CPC .... *G06F 16/24575* (2019.01); *G06F 16/2272* (2019.01)

(58) Field of Classification Search
CPC .............. G06F 16/24575; G06F 16/2272
See application file for complete search history.

(56) References Cited

U.S. PATENT DOCUMENTS

| | | | |
|---|---|---|---|
| 7,716,203 B2 | 5/2010 | Chouinard | |
| 7,769,708 B2 | 8/2010 | Caruso | |
| 8,799,282 B2 | 8/2014 | Goldenberg | |
| 10,346,439 B2 | 7/2019 | Agarwal | |
| 11,386,126 B1 * | 7/2022 | Lehmann | G06F 16/285 |
| 2020/0356564 A1 * | 11/2020 | Singh | G06F 16/24549 |
| 2021/0357375 A1 | 11/2021 | Urdiales | |
| 2022/0035777 A1 | 2/2022 | Seth | |
| 2022/0164396 A1 * | 5/2022 | Seth | G06F 16/90344 |

OTHER PUBLICATIONS

"Disclosed Anonymously", "System and Method for Predictive Pre-Run Probabilistic Match Configurator", An IP.Com Prior Art Database Technical Disclosure, IP.com No. IPCOM000265054D, Feb. 21, 2021.
Kochar et al; "Applying Machine Learning to Data Stewardship", Published in Inside Macine Learning, Aug. 12, 2019, 14 PGS. <https://medium.com/inside-machine-learning/applying-machine-learning . . . >.

* cited by examiner

*Primary Examiner* — Charles Rones
*Assistant Examiner* — Xiaoqin Hu
(74) *Attorney, Agent, or Firm* — David K. Mattheis

(57) ABSTRACT

Revising data management indices by defining a plurality of data entity buckets, assigning bucket hash values to each data record according to the plurality of data entity buckets, generating a record index including data record bucket membership data, determining a combined record score for each data record according to the bucket membership data, revising data record relationship indices of a data management system according to the combined record score of a data record, and responding to a user query according to the record index including the revised record relationships.

20 Claims, 2 Drawing Sheets

BULK MATCHING DATA RECORD ENTITIES

FIELD OF THE INVENTION

The disclosure relates generally to the matching of entities in data management systems. The invention relates particularly to the bulk-matching of entities in master data management systems.

BACKGROUND

Master Data Management (MDM) based solutions work with enterprise data, perform indexing, matching and linking of data from different sources creating a 360 degree view of customer data.

Probabilistic matching processes involve data standardization, bucketing, and comparison, to arrive at similarity of the two record pairs. Bucketing generates a candidate list for comparisons. From the candidate list of the data, comparing different record attributes (e.g., Name, Address, DOB, Identifier) from each pair of records based on a series of mathematically derived statistical probabilities and complex weight tables, determines if they match and should subsequently be linked.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable revising data management indices according to data record entity relationships.

Aspects of the invention disclose methods, systems and computer readable media associated with Revising data management indices by defining a plurality of data entity buckets, assigning bucket hash values to each data record according to the plurality of data entity buckets, generating a record index including data record bucket membership data, determining a combined record score for each data record according to the bucket membership data, revising data record relationship indices of a data management system according to the combined record score of a data record, and responding to a user query according to the record index including the revised record relationships.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
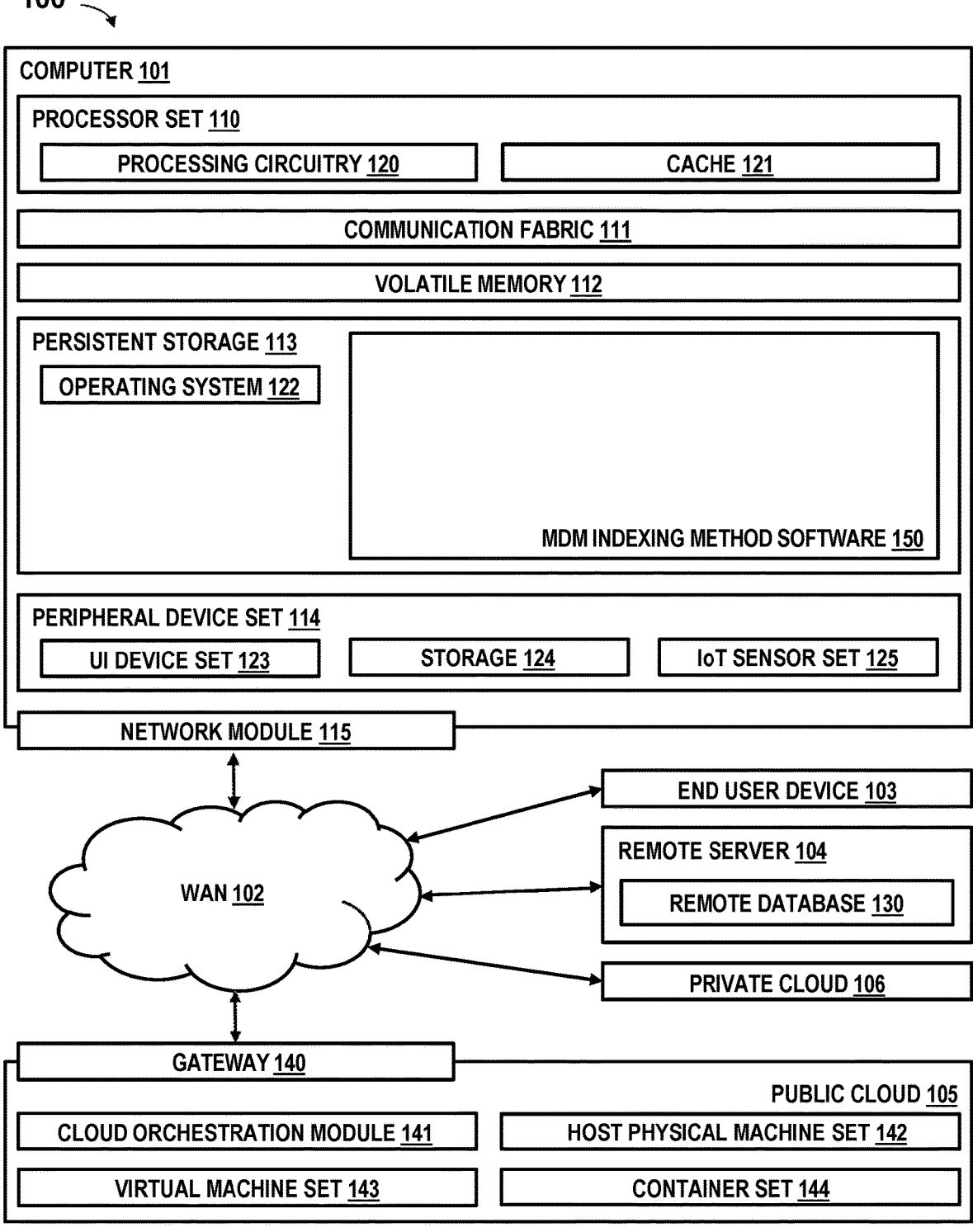
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Unsupervised data management matching engines driven by complex algorithms trained through sophisticated statistical processes evaluate likely "matched" and "random" pairs of records selected during bulk analytic processes. These methods yield highly accurate results. Achieving hyper-accurate results often requires supervised learning to further tune/refine the algorithms.

Probabilistic matching may include normalizing and compacting the data set, yielding a derived data layer, through the use of phonetic equivalence, data record tokenization, nicknames, etc. This matching then compares all attributes to identify all potential matches in the data set, including partial matches, data reversals, transpositions, anonymous field values, etc. One-by-one comparisons across all attributes yield a weighted score for each pair of records. Business-specific frequency weighting may be applied to attribute pairings. Score thresholds associated with categories such as "link", don't link, and "don't know" may then be applied to the scores for each record pairing. Evaluating all records in this manner is computationally intensive and expensive.

Supervised learning can be tedious and time consuming, often requiring a user to work through dozens or hundreds of sample pairs to further refine the user's linking preference (s). "Bulk matching" may be used to identify related data records in less time and with fewer computational resources.

Aspects of the present invention relate generally to data management systems and, more particularly, to entity management in data management systems—determining which data records are linked to or otherwise match, each other, and which records are not matched to each other. In embodiments, a data management system receives a query from a user device, identifies records associated with the query terms, and provides the identified records to the user device. According to aspects of the invention, the data management system automatically and dynamically adjusts a data record index according to data record entity bucket memberships identified using bucket hash values and hash value frequency associated bucket weightings. Methods assign hash values to individual records according to bucket memberships, generate a record index including respective record bucket membership data, determine a combined record score for each record according to bucket membership data, revise records relationships in the record index according to the combined scores, and respond to the user device query using the revised record relationship index. Score thresholds may be defined to categorize records as matched (linked), unmatched (unlinked), or having an unknown relationship requiring user input to define.

In accordance with aspects of the invention there is a method for automatically revising record relationships according to entity bucket memberships, the method comprising: defining a plurality of data entity buckets, each data entity bucket comprising a bucket role weight, assigning bucket hash values to each data record according to the plurality of data entity buckets, determining a combined record scorer for each data record according to the bucket hash values and bucket role weights, revising data record relationship indices of a data management system according to the combined record score of a data record, and responding to a user query according to the record index including the revised record relationships.

Aspects of the invention provide an improvement in the technical field of master data management systems. Conventional data management systems utilize probabilistic matching of all potential record pairs to determine record relationships. As a result, the system utilizes relatively large amounts of time and computing resources to compile and maintain record relationship status data. In some cases, however, bulk matching of record attributes enables rapid determination of record relationships among many data records, reducing time and resource requirements. Implementations of the invention leverage this ability efficiently generate and maintain an index of record relationships compiled according to entity bucket membership data for the records. This provides the improvement of achieving a desired outcome for the user (i.e., providing answers to entity-related queries, which may be user-defined) while at the same time avoiding the disadvantages associated with a purely probabilistic method. In practice, disclosed embodiments the cost of on-going record comparison may be reduced between 60-70% over traditional methodologies through reduced time and resource requirements for the comparisons.

Aspects of the invention also provide an improvement to computer functionality. In particular, implementations of the invention are directed to a specific improvement to the way master data management systems operate, embodied in the continually adjusted record relationship indices according to entity bucket membership data for the records. In embodiments, the system adjusts the record indices as record data changes or is added to the system, such that the record index utilized for the next question may differ from the record index that is applied to the current question. As a result of adjusting the record index according to bucket membership data, the system increases or decreases the likelihood that the system will provide properly linked records as an answer for the next question. In this manner, embodiments of the invention affect how the master data management system functions (i.e., the likelihood of providing appropriate records as an answer to a question) from one question to the next.

As an overview, a master data management (MDM) system is an automated system which provides linked records in response to queries from a user. The M system receives inputs from various sources including input over a network. Data storage devices store the corpus of data. The MDM system compiles an index associating data records such that, in response to a query from a user device, the MDM system provides one or more data records associated with the search terms of the query.

In an embodiment, one or more components of the system can employ hardware and/or software to solve problems that are highly technical in nature (e.g., defining a plurality of data entity buckets, each data entity bucket comprising a bucket role weight, assigning bucket hash values to each data record according to the plurality of data entity buckets, generating a record index according to bucket membership data determining a combined record score for each data record according to the bucket membership data, revising the record relationship index of a data management system according to the combined record score of a data record, responding to a user query according to the record index including the revised record relationships, etc.). These solutions are not abstract and cannot be performed as a set of mental acts by a human due to the processing capabilities needed to facilitate data management, for example. Further, some of the processes performed may be performed by a specialized computer for carrying out defined tasks related to master data management. For example, a specialized computer can be employed to carry out tasks related to data management or the like.

In one embodiment, methods define a plurality of entity attribute buckets for an MDM system. Exemplary entity attribute buckets may include Person buckets such as Name+Phone, Name+Date of Birth, Name+social security number, Name+post code, etc. Rather than using probabilistic methods to review all possible record pairings using these buckets, method embodiments define and assign a hash value for each record for each bucket associated with that record, yielding a series of bucket membership hash values for each record of the data set. In one embodiment, methods generate hash values (hashes) using message-digest algorithms such as the MD5 algorithm. MD5 is a one-way cryptographic function that accepts a message of any length as input and returns as output a fixed-length digest value to be used for authenticating the original message.

In this embodiment, methods generate a record index, each entry of the index associated with a data record and including the bucket membership hash values for the respective record. In this embodiment, methods then review the index and identify records having overlapping bucket hash values—records having one or more shared bucket hash values.

In one embodiment, methods define a bucket role and associated role weighting for each bucket. As an example, methods evaluate the data set in terms of bucket hash value frequency and define bucket role weights according to the bucket hash frequency with more common bucket roles having larger role weight values. A bucket role is defined based on attributes or a combination of attributes. In one embodiment, the system has an algorithm for matching and the weights associated with the attributes are defined as part of the algorithm. These values are based on knowledge of uniqueness and importance of the attributes. As an example, an SSN would typically have higher weight as compared to Address. The weights associated with bucket-roles can be derived as a function of the associated attributes-weights. As a simplified example, a weight of a "name+zip" bucket role may be derived as an average of weights given to name and address.

In this embodiment, methods determine a combined score for each candidate record pair having at least one shared bucket hash value—at least one shared bucket membership. Methods determine the combined score according to the number of shared bucket hash values for that record pair together with the role weighting for each of the shared bucket hash values of the record pair. This yields a combined score for each candidate record sharing at least one bucket membership hash value as part of the generated record index which includes the bucket membership data. Methods consider records having no overlapped bucket membership hash values as singletons and no further analysis of matched records for such records occurs.

In one embodiment, methods rank all records of the index according to the combined score for each candidate record pair. Methods further categorize the ranked record pairs having a combined score exceeding an upper threshold as matched (linked) records, and record pairs failing to satisfy a lower threshold as unmatched record pairs. In one embodiment, the upper and lower threshold may be a single threshold. In one embodiment, combined scores exceeding the lower threshold and failing to exceed the upper threshold represent record pairings uncategorized as either matching or unmatched. Such pairs may be subjected to a more rigorous comparison including an attribute-by-attribute comparison across the attributes of the pair to yield either a matched or unmatched classification for the pair.

In one embodiment, thresholds may be defined according to a system administrator. In one embodiment, thresholds may have default values according to historic record pair evaluations. Thresholds may be adjusted according to the more rigorous evaluation of unclassified record pairs after consistent classification of unclassified record pairs having combined scores near a defined threshold occurs.

After determining combined scores for candidate record pairs, the method revises record pair classifications according to the new combined scores and the defined score thresholds. In one embodiment, previously unclassified or unmatched record pairs may now be classified as matched, previously unclassified or matched record pairs may be classified as unmatched, and previously matched or unmatched record pairs may be classified as unclassified, resulting in a more rigorous review of the record pair's attributes.

After revisions to the record pair index, the method utilizes the revised index in responding to queries from a user device. Query responses reflect current record classifications for each record such that a query with values for particular attributes of a first records will yield a set of results reflecting all records currently classified as matching that first record according to the current revised record index. In one embodiment, methods maintain the index as current using provided data and utilize the most current record matching index in responding to user queries.

As shown in FIG. 1, computing environment 100 contains an example of an environment for the execution of at least some of the computer code involved in performing the inventive methods, such as MDM index revision method 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
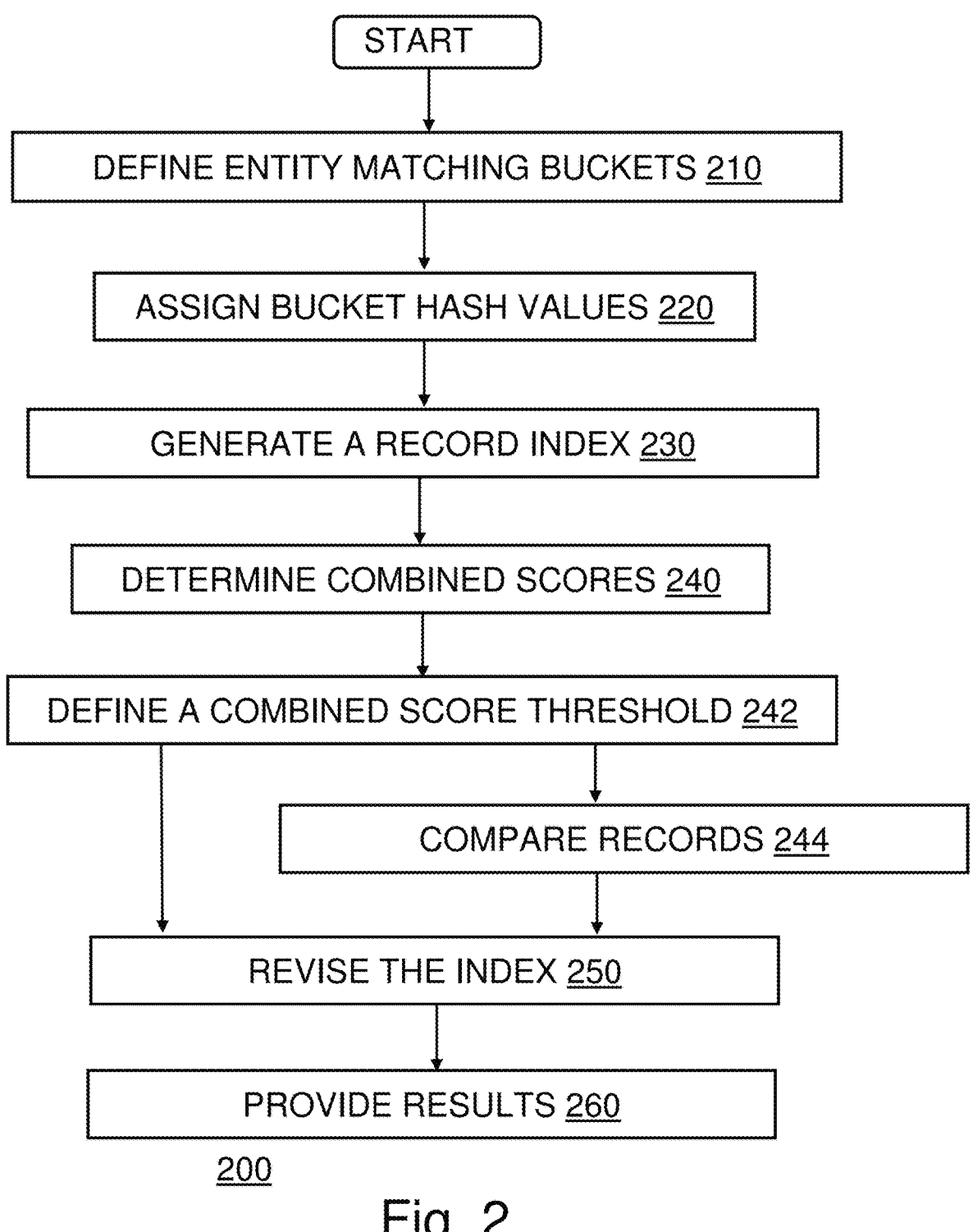
FIG. 2 provides a flowchart depicting an operational sequence, according to an embodiment of the invention.

FIG. 2 provides a flowchart 200, illustrating exemplary activities associated with the practice of the disclosure. After program start, at block 210, method of MDM method 150 defines a plurality of entity buckets for the data set. Such buckets reflect attribute combinations of matching record pairs.

At block 220, MDM method 150 determines and assigns a bucket hash value for each entity bucket associated with each data record. The bucket hash value corresponds to the associated field values of the record for the particular bucket.

At block 230, MDM method 150 compiles a record index including the bucket membership values—bucket hash values—for each record, as well as other record data such as a record identification, search strings associated with the record, etc.

At block 240, MDM method 150 determines combined scores for each candidate record pair having at least one shared bucket membership hash value. In one embodiment, the method determines the combined score according to the number of shared bucket hash values and a bucket role weighting associated with the shared bucket memberships. In this embodiment, the role weighting may be determined as directly proportionate to the frequency of each bucket being shared between pairs across the data set such that the most commonly shared bucket has a higher weighting than a bucket which is not shared across any pairs of the data set.

At block 242, method 150 defines one or more combined score thresholds. At block 250, MDM method 150 revises the record index by comparing the current combined score for each pair to one or more score thresholds. In one embodiment, the method 150 categorizes record pairs having a combined score exceeding an upper threshold as a matched or linked record pair, record pairs failing to achieve a lower threshold as an unmatched record pair. At block 244, the MDM method 150 conducts a rigorous attribute by attribute comparison upon and record pairs having a combined score between the two thresholds and classifies such record pairs as matched or unmatched based upon a probabilistic evaluation of this attribute-by-attribute evaluation of the record pair. After comparing the combined scores and threshold, MDM method 150 revises the record index to reflect any change in status for any of the record pairs of the data set.

At block 260, MDM method 150 utilizes the revised index in selecting records for presentation of a user in response to an entity query, identifying an initial set of records matching the explicit values of the query as well as records currently classified as matching those records of that initial set of records. The method then presents all of the initial and subsequent matching records to the user.

In one embodiment, a user may provide feedback on presented records to indicate a false positive—a record inaccurately identified as matching the query terms. In this embodiment, MDM method may alter the method threshold according to appropriately classify the record.

It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, or media, as those terms are used in the present disclosure, explicitly excludes storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage medium or device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for revising a data management index, the method comprising:
   defining a plurality of data entity buckets;
   assigning a bucket membership hash value to a data record according to each of the plurality of data entity buckets associated with the data record;

identifying a candidate data record pair, the data records of the candidate data record pair having a shared bucket membership hash value;

determining a combined record score for each data record of the candidate data record pair according to a number of bucket membership hash values shared between the data records of the candidate data record pair, together with a role weighting for each shared bucket membership hash value, wherein the role weighting for a shared bucket membership hash value is directly proportional to a frequency of the shared bucket being shared between all candidate data record pairs;

revising data record relationships for each data record of the candidate data record pair in a record index of a data management system according to the combined record score for each data record of the candidate data record pair; and responding to a user query according to the record index including the revised data record relationships.

2. The computer implemented method according to claim 1, wherein revising data record relationships comprises revising matching data record relationships.

3. The computer implemented method according to claim 1, wherein revising data record relationships comprises revising linked data record relationships.

4. The computer implemented method according to claim 1, wherein revising data record relationships comprises revising unmatched data record relationships.

5. The computer implemented method according to claim 1, further comprising defining a first combined score threshold and revising data record relationships for data records having combined scores exceeding the first combined score threshold, as matched records.

6. The computer implemented method according to claim 1, further comprising defining a second combined score threshold and revising data record relationships for data records having combined scores failing to satisfy the second combined score threshold, as unmatched records.

7. The computer implemented method according to claim 1, further comprising defining a third combined score threshold and a fourth combined score threshold and conducting an attribute-by-attribute comparison of data records having combined scores exceeding the third combined score threshold and failing to exceed the fourth combined score threshold.

8. A computer program product for revising data management indices, the computer program product comprising one or more computer readable storage media and collectively stored program instructions on the one or more computer readable storage media, the stored program instructions which, when executed, result in one or more computer systems:

defining a plurality of data entity buckets;

assigning a bucket membership hash value to a data record according to each of the plurality of data entity buckets associated with the data record;

identifying a candidate data record pair, the data records of the candidate data record pair having a shared bucket membership hash value;

determining a combined record score for each data record of the candidate data record pair according to a number of bucket membership hash values shared between the data records of the candidate data record pair, together with a role weighting for each shared bucket membership hash value, wherein the role weighting for a shared bucket membership hash value is directly proportional to a frequency of the shared bucket being shared between all candidate data record pairs;

revising data record relationships for each data record of the candidate data record pair in a record index of a data management system according to the combined record score for each data record of the candidate data record pair; and responding to a user query according to the record index including the revised data record relationships.

9. The computer program product according to claim 8, wherein revising data record relationships comprises revising matching data record relationships.

10. The computer program product according to claim 8, wherein revising data record relationships comprises revising linked data record relationships.

11. The computer program product according to claim 8, wherein revising data record relationships comprises revising unmatched data record relationships.

12. The computer program product according to claim 8, further comprising defining a first combined score threshold and revising data record relationships for data records having combined scores exceeding the first combined score threshold, as matched records.

13. The computer program product according to claim 8, further comprising defining a second combined score threshold and revising data record relationships for data records having combined scores failing to satisfy the second combined score threshold, as unmatched records.

14. The computer program product according to claim 8, further comprising defining a third combined score threshold and a fourth combined score threshold and conducting an attribute-by-attribute comparison of data records having combined scores exceeding the third combined score threshold and failing to exceed the fourth combined score threshold.

15. A computer system for revising data management indices, the computer system comprising:

one or more computer processors;

one or more computer readable storage media; and stored program instructions on the one or more computer readable storage media for execution by the one or more computer processors, the stored program instructions which, when executed, result in the one or more computer processors:

defining a plurality of data entity buckets;

assigning a bucket membership hash value to a data record according to each of the plurality of data entity buckets associated with the data record;

identifying a candidate data record pair, the data records of the candidate data record pair having a shared bucket membership hash value;

determining a combined record score for each data record of the candidate data record pair according to a number of bucket membership hash values shared between the data records of the candidate data record pair, together with a role weighting for each shared bucket membership hash value, wherein the role weighting for a shared bucket membership hash value is directly proportional to a frequency of the shared bucket being shared between all candidate data record pairs;

revising data record relationships for each data record of the candidate data record pair in a record index of a data management system according to the combined record score for each data record of the candidate data record pair; and responding to a user query according to the record index including the revised data record relationships.

16. The computer system according to claim 15, wherein revising data record relationships comprises revising matching data record relationships.

17. The computer system according to claim 15, wherein revising data record relationships comprises revising linked data record relationships.

18. The computer system according to claim 15, wherein revising data record relationships comprises revising unmatched data record relationships.

19. The computer system according to claim 15, further comprising defining a first combined score threshold and revising data record relationships for data records having combined scores exceeding the first combined score threshold, as matched records.

20. The computer system according to claim 15, further comprising defining a second combined score threshold and revising data record relationships for data records having combined scores failing to satisfy the second combined score threshold, as unmatched records.

* * * * *